United States Patent
Sharma

(10) Patent No.: US 9,171,292 B1
(45) Date of Patent: Oct. 27, 2015

(54) METHOD AND SYSTEM FOR PROVIDING ELECTRONIC DELIVERY OF REGULATED SHAREHOLDER COMMUNICATIONS TO ACCOUNT ELECTRONIC MAIL ADDRESSES

(71) Applicant: Inveshare, Inc., Alpharetta, GA (US)

(72) Inventor: Rahul Sharma, Alpharetta, GA (US)

(73) Assignee: INVeSHARE, Inc., Alpharetta, GA (US)

( * ) Notice: Subject to any disclaimer, the term of this patent is extended or adjusted under 35 U.S.C. 154(b) by 268 days.

(21) Appl. No.: 13/773,170

(22) Filed: Feb. 21, 2013

Related U.S. Application Data

(60) Provisional application No. 61/601,242, filed on Feb. 21, 2012.

(51) Int. Cl.
*G07C 13/00* (2006.01)
*G06Q 10/10* (2012.01)

(52) U.S. Cl.
CPC .................................. *G06Q 10/107* (2013.01)

(58) Field of Classification Search
CPC ................................ G07C 13/00; G07C 5/008
USPC ........................................... 705/12; 235/486
See application file for complete search history.

(56) References Cited

U.S. PATENT DOCUMENTS

| | | | | |
|---|---|---|---|---|
| 7,665,662 | B2 * | 2/2010 | Faulk | 235/386 |
| 7,953,589 | B1 * | 5/2011 | Niebanck | 704/2 |
| 2002/0133396 | A1 * | 9/2002 | Barnhart | 705/12 |

OTHER PUBLICATIONS

PR Newswire. Inveshare Delivers optionsXpress' Advanced Shareholder Communications Service for retail Investors: Innovation Solution helps achieve almost 100% digital Delivery Dec. 8, 2009.*

\* cited by examiner

*Primary Examiner* — Jagdish Patel

(74) *Attorney, Agent, or Firm* — Barclay Damon, LLP

(57) ABSTRACT

A method, system, and computer program product for electronic delivery of regulated shareholder communications to registered electronic mail client accounts. A signed regulated shareholder communication electronic mail is generated by a proxy platform server computer and the electronic mail is transmitted to an electronic mail address inbox of a client computer. An active content associated with the shareholder communication is delivered by the proxy platform server computer when the shareholder communication is opened by a user on the client computer. The user is authenticated by the proxy platform server computer. A voting ballot is delivered by the platform server computer to the authenticated user's opened shareholder communication. The ballot votes submitted from the opened shareholder communication by the user are recorded in a proxy platform server computer voting database.

18 Claims, 7 Drawing Sheets

FIG. 5

| PROXY BALLOT(S) | | WELCOME JOHN SMITH | | LOG OUT |

PROXY BALLOT(S)
VOTING INSTRUCTIONS
TIVO, INC. MANAGEMENT
PROXY STATEMENT ANNUAL REPORT

1. BOARD OF DIRECTORS & MANAGEMENT VOTE RECOMMENDATION

SPEEDVOTE   LEARN MORE
SELECT VOTING GUIDELINE (OPTIONAL) ▽

| PROPOSAL | | |
| --- | --- | --- |
| NOMINEES | | |

| | FOR | WITHHOLD | MESSAGE |
| --- | --- | --- | --- |
| THOMAS ROGERS | ○ | ○ | |
| J. HEIDI ROIZEN | ○ | ○ | |

OTHER PROPOSALS:

| PROPOSAL TYPE | VOTE FOR | VOTE AGAINST | ABSTAIN | MESSAGE |
| --- | --- | --- | --- | --- |
| RATIFY AUDITORS | ○ | ○ | ○ | |
| EVALUATING INCENTIVE BONUS PLANS AND OTHER OBRA-RELATED PROPOSALS | ○ | ○ | ○ | |
| APPROVE COMPENSATION PLAN (SAY ON PAY) | ○ | ○ | ○ | |
| COMPANY SPECIFIC- BOARD-RELATED | ○ | ○ | ○ | |

PROPOSAL

2. TO RATIFY THE SELECTION OF KPMG LLP AS THE COMPANY'S INDEPENDENT REGISTERED PUBLIC ACCOUNTING FIRM FOR THE FISCAL YEAR ENDING JANUARY 31, 2012.

3. TO APPROVE AN AMENDMENT TO THE AMENDED & RESTATED 2008 EQUITY INCENTIVE AWARD PLAN TO RESERVE AN ADDITIONAL 5,000,000 SHARES OF OUR COMMON STOCK FOR ISSUANCE.

4. TO APPROVE ON A NON-BINDING, ADVISORY BASIS THE COMPENSATION OF OUR NAMED EXECUTIVE OFFICERS AS DISCLOSED IN THIS PROXY STATEMENT PURSUANT TO THE COMPENSATION DISCLOSURE RULES OF THE SECURITIES AND EXCHANGE COMMISSION ("SAY-ON-PAY").

5. TO APPROVE ON A NON-BINDING ADVISORY BASIS WHETHER A SAY-ON-PAY VOTE SHOULD OCCUR EVERY ONE (1) YEAR, EVERY TWO (2) YEARS, OR EVERY THREE (3) YEARS. VOTE FOR IT YOU WISH TO ESTABLISH AN ADVISORY VOTE ON THE SAY ON PAY PROPOSALS BE HELD EVERY YEAR AGAINST IF YOU WISH TO PROPOSE THEY BE HELD ONCE EVERY 2 YEARS AND ABSTAIN IF YOU WISH TO PROPOSE THEY BE HELD ONCE EVERY 3 YEARS.

TO VIEW YOUR ACCOUNTS AND CHANGE WHICH ACCOUNTS YOU ARE VOTING ON, VIEW THE ACCOUNT LIST.

VOTE

METHOD AND SYSTEM FOR PROVIDING ELECTRONIC DELIVERY OF REGULATED SHAREHOLDER COMMUNICATIONS TO ACCOUNT ELECTRONIC MAIL ADDRESSES

CROSS-REFERENCE TO RELATED APPLICATIONS

This application claims the benefit of U.S. Provisional Patent Application Ser. No. 61/601,242 filed on Feb. 21, 2012. The specification and drawings of the provisional patent application are specifically incorporated by reference herein.

TECHNICAL FIELD

Embodiments of the invention generally relate to electronic delivery of shareholder communications and, more particularly, to proxy voting of shares directly from shareholder electronic mail addresses.

BACKGROUND

Corporations and mutual fund companies have been searching for solutions to the inefficiency and expense associated with postal mail and telephone communications to voters related to meetings, corporate governance, regulatory or compliance matters, merger, acquisitions, takeovers, written consents, proxy contests, or simply dissemination of information to voters.

A number of vendors have started to provide technology-based outsourcing services to the financial services industry. Such services include investor communications electronic solutions. However, current market offerings direct the shareholders away from their electronic mail and to corporate and proxy websites to access shareholder ballots and submit their voting response. The extra steps necessary to access the corporate or proxy website and enter their shareholder identification (ID) to gain access to the secure content creates a user barrier which leads to uninformed voting or no voting at all.

These vendors have made proxy voting easier by launching electronic, web-based proxy voting solutions where the shareholder receives an e-mail notification of an event to vote. However, as noted above, the shareholder is directed away from his e-mail to a website where he must use security credentials provided to log in for access to the meeting materials and ballot. From the ballot, the shareholder can cast his vote.

SUMMARY

The embodiments disclosed are directed to combining the notification and ballot in one streamlined delivery system directly within the shareholder's e-mail account. The shareholder can cast his vote from within the e-mail which reduces the number of steps involved to cast his vote.

The embodiments include an electronic platform to remove the barriers and streamline the user experience to encourage shareholders to review important information from the issuer and exercise their right to vote. In an exemplary embodiment, "Vote by E-mail" functionality is included in a software application for providing electronic delivery of regulated shareholder communications to account holder e-mail addresses. The account holders receive e-mail notifications and can accept delivery of the new shareholder materials without leaving their e-mail client. This functionality, referred to herein as EZ-Proxy, allows account holders direct, easy access to their proxy ballots, informational only events, and corporate actions from within a rich content and interactive e-mail which simulates browser behavior within the e-mail client. It also delivers annual and semi-annual reports and prospectuses which are accessible via a link. Shareholder responses are captured within the e-mail client and submitted to the EZ-Proxy service provider's database which then tabulates the results across all response channels.

In one embodiment, a method, system, and computer program product are provided for electronic delivery of regulated shareholder communications to registered electronic mail client accounts. A signed regulated shareholder communication electronic mail is generated by a proxy platform server computer and the electronic mail is transmitted to an electronic mail address inbox of a client computer. An active content associated with the shareholder communication is delivered by the proxy platform server computer when the shareholder communication is opened by a user on the client computer. The user is authenticated by the proxy platform server computer. A voting ballot is delivered by the proxy platform server computer to the authenticated user's opened shareholder communication. The ballot votes submitted from the opened shareholder communication by the user are recorded in a proxy platform server computer voting database.

BRIEF DESCRIPTION OF THE DRAWINGS

These and other advantages and aspects of the embodiments of the disclosure will become apparent and more readily appreciated from the following detailed description of the embodiments taken in conjunction with the accompanying drawings, as follows.

FIG. 5 illustrates the ballot for review by the shareholder in his e-mail account in an exemplary embodiment.

FIG. 6 illustrates shareholder vote selection and confirmation form within the shareholder's e-mail account in an exemplary embodiment.

DETAILED DESCRIPTION

The following description is provided as an enabling teaching of embodiments of the invention. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

The "vote by e-mail" ("EZ-Proxy") application provides electronic delivery of "signed" regulated shareholder communications to account holder e-mail addresses. In the present context, a signed regulated shareholder communications refers to a secure e-mail associated with the e-mail client. Account holders receive e-mail notifications and can accept delivery of new shareholder materials without leaving their e-mail client. EZ-Proxy allows account holders direct, easy access to their proxy ballots, informational only events, and corporate actions from within a rich content and interactive e-mail which simulates the browser behavior within an e-mail client. EZ-Proxy also delivers annual and semi-annual reports and prospectuses which are accessible via a link.

Vote by e-mail records for the voting events are submitted to the EZ-Proxy service provider's database which then tabulates the results across all response channels. EZ-Proxy application uses ActiveMail® in order to render the rich content in a secure manner within the e-mail client. The e-mail client can be installed on any computer platform having e-mail capability including, without limitation, personal computers, laptops, tablets, handheld devices, and smart phones.

The functionality of EZ-Proxy provides an advantage over the current market offerings because it streamlines the voting process. EZ-Proxy aides and encourages the investor to receive his proxy delivery and return his vote submission for events that he might have missed or ignored with the standard practices in place.

EZ-Proxy "Voting By E-Mail" Process

FIGS. 1-6 represent exemplary screen shots depicting the process flow from the time the shareholder gets the shareholder e-mail to the time when he casts his vote.

Figure 1:
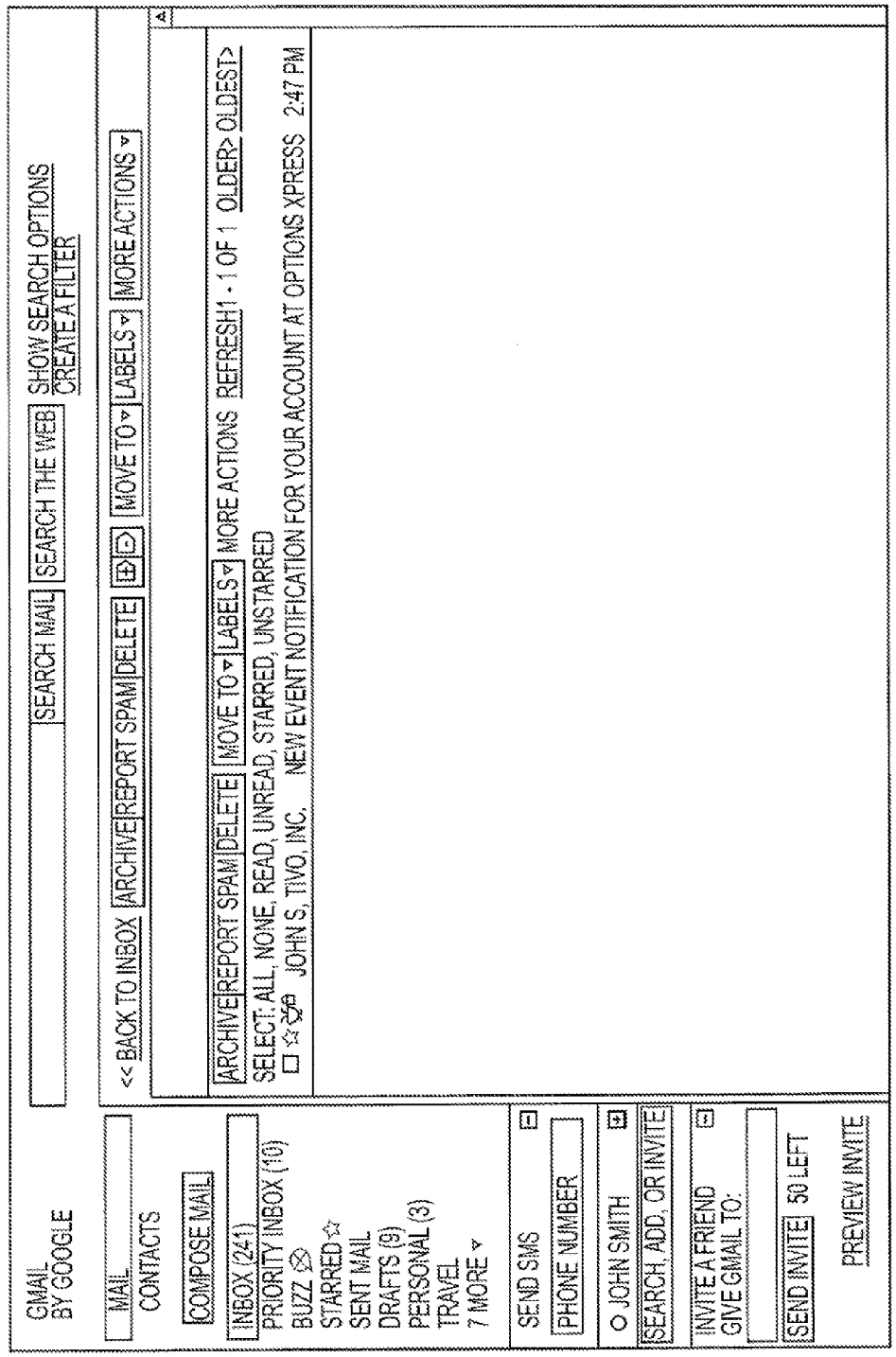
FIG. 1 illustrates a shareholder notification for a shareholder meeting event in an exemplary embodiment.
Figure 2:
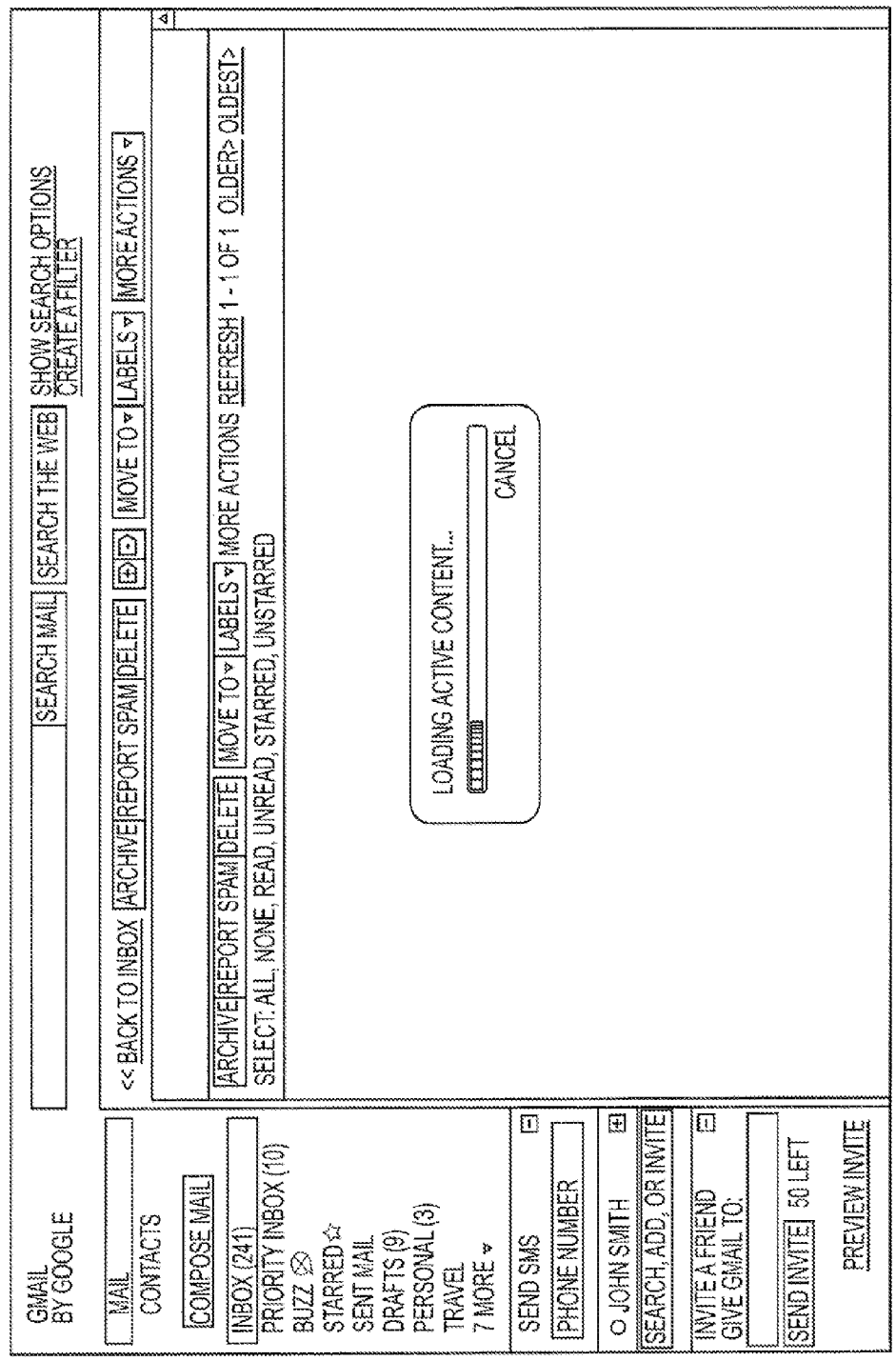
FIG. 2 illustrates loading of active content of the electronic mail message in an exemplary embodiment.

The process begins with the EZ-Proxy service provider delivering meeting information and ballots to shareholders of record by mail or e-mail. E-mail recipients receive an e-mail alerting them of the upcoming meeting. FIG. 1 illustrates an exemplary embodiment of a shareholder's electronic mail account and the appearance of a meeting notice when it arrives in the inbox. Upon opening the e-mail, the shareholder receives a message that the active content in the e-mail is loading. The active content is provided by the EZ-Proxy service provider. FIG. 2 illustrates loading of active content of the electronic mail message in an exemplary embodiment.

In some embodiments, a secure e-mail communication product, such as ActiveMail® available from ActivePath, Inc., is utilized in order to render "rich content" in a secure manner within the shareholder's e-mail client. ActiveMail® provides a secure and interactive email solution that enables viewing of online content within the body of an email message without the need to click outside the email to view the content. This enables shareholders to conduct secure communications, including voting on shareholder issues, via ActiveMail® without clicking on a link or opening a new browser.

Figure 3:
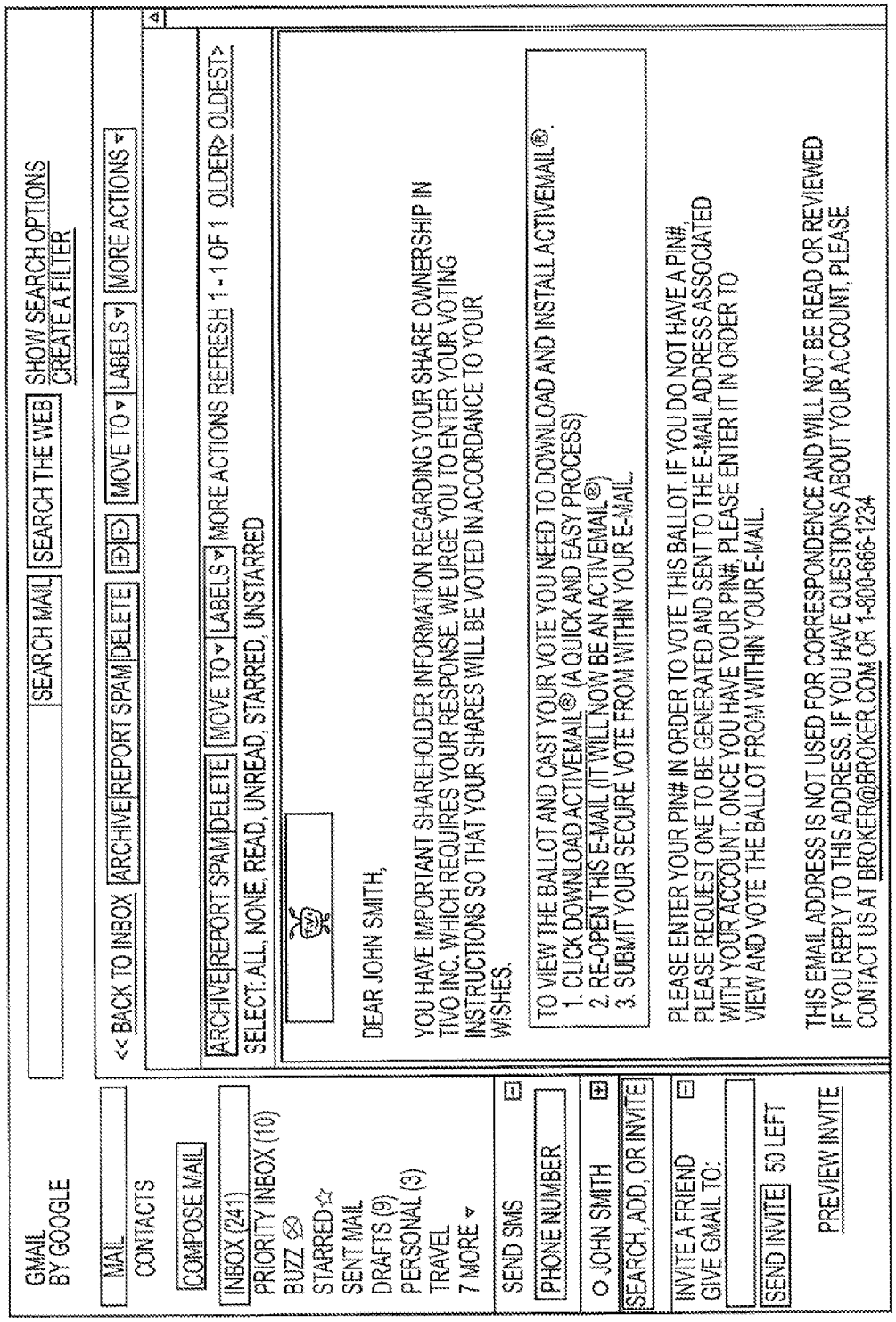
FIG. 3 illustrates a meeting notification with instructions for accessing the ballot within the shareholder's email account in an exemplary embodiment.

If the shareholder has not used the ActiveMail® plug-in previously on his electronic mail client, he will be prompted to install it and will be provided with instructions for doing so. Once the ActiveMail® plug-in is installed, when the shareholder opens the e-mail, the meeting notification appears with instructions to access the ballot. FIG. 3 illustrates a meeting notification with instructions for accessing the ballot within the shareholder's e-mail account in an exemplary embodiment.

Figure 4:
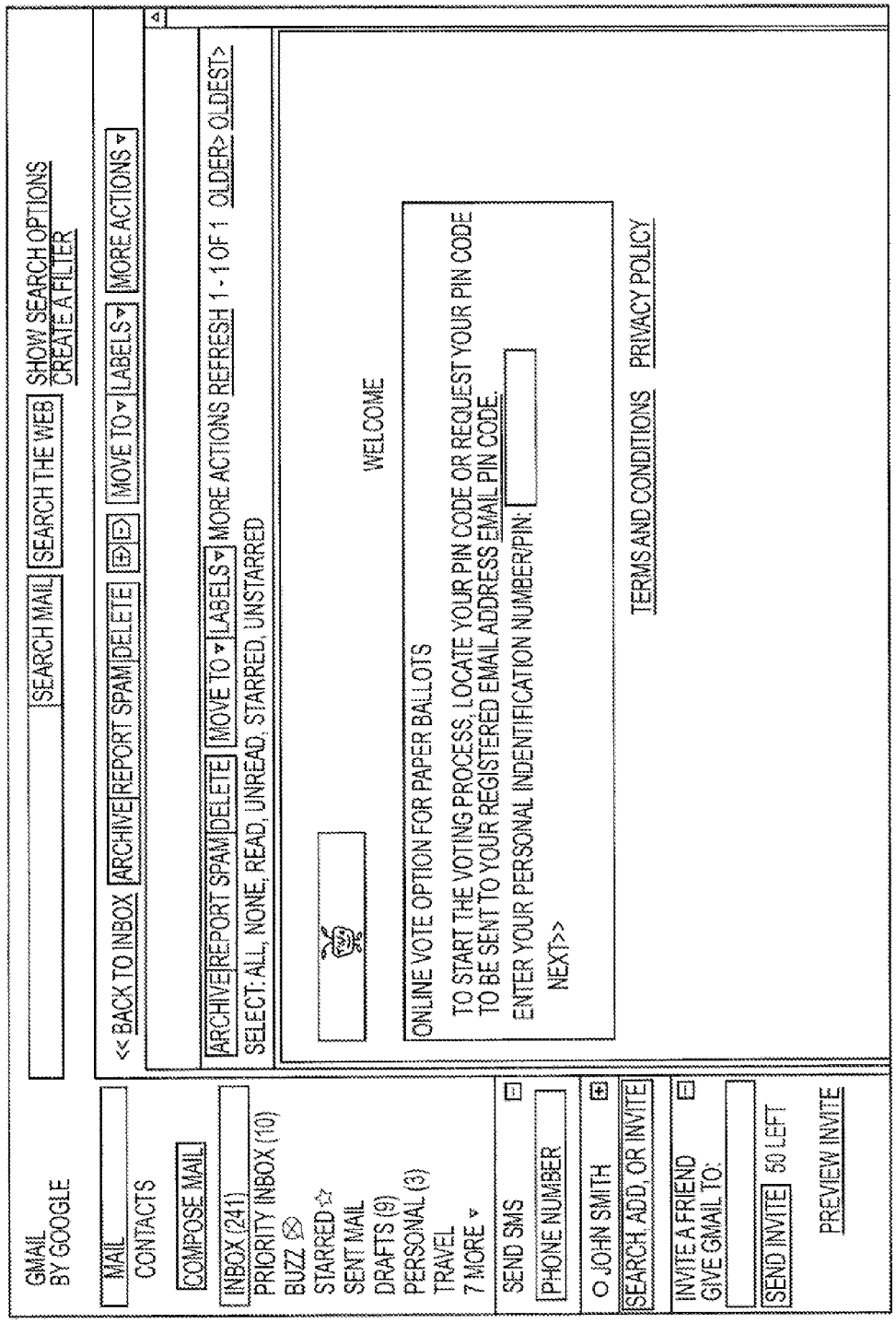
FIG. 4 illustrates use of secure access to the ballot by entering a shareholder's PIN in an exemplary embodiment.

Next, the shareholder is prompted to enter his personal identification number (PIN). FIG. 4 illustrates use of secure access to the ballot by prompting the shareholder to enter his PIN in an exemplary embodiment. The shareholder submits his PIN and the electronic ballot appears. If the shareholder does not have a PIN, he can request that one to be sent to him with a click on the link which automatically sends it to the registered e-mail address for his electronic mail account. The meeting materials are available as links on the ballot and shareholder proposals are hyperlinked to the relevant sections of the proxy statement just like they are on the actual web portal.

Figure 6:
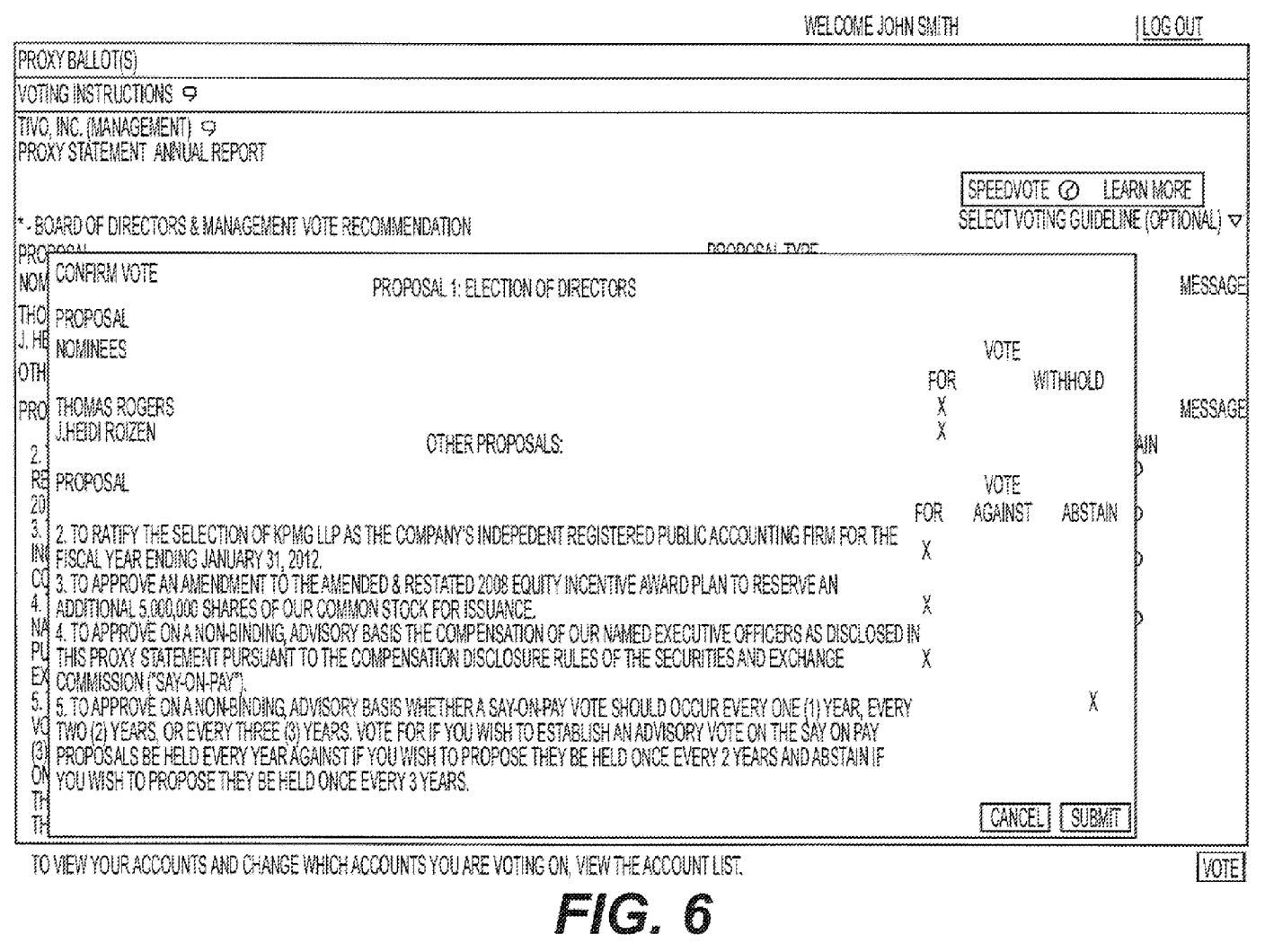

FIG. 5 illustrates an exemplary representation of the electronic ballot presented within the e-mail client. The shareholder makes his vote selections on the electronic ballot. FIG. 6 illustrates a shareholder vote selection and confirmation form within the shareholder's email account in an exemplary embodiment. The shareholder then submits his vote selections. The vote submission is instantly recorded on the EZ-Proxy service provider's database.

The shareholder may delete the e-mail once his vote is safely stored in the EZ-Proxy service provider's database. Alternatively, he may choose to keep the e-mail and to resubmit his vote as many times as he wants until the voting cut-off date. Each time that the shareholder accesses his e-mail, he will be able to view the real-time data as it exists on the EZ-Proxy service provider's system. Each vote on the same ballot submitted by the shareholder before the deadline overwrites the previous vote submitted by the shareholder. The timestamp associated with the submitted ballot is captured by the EZ-Proxy service provider's system.

Figure 7:
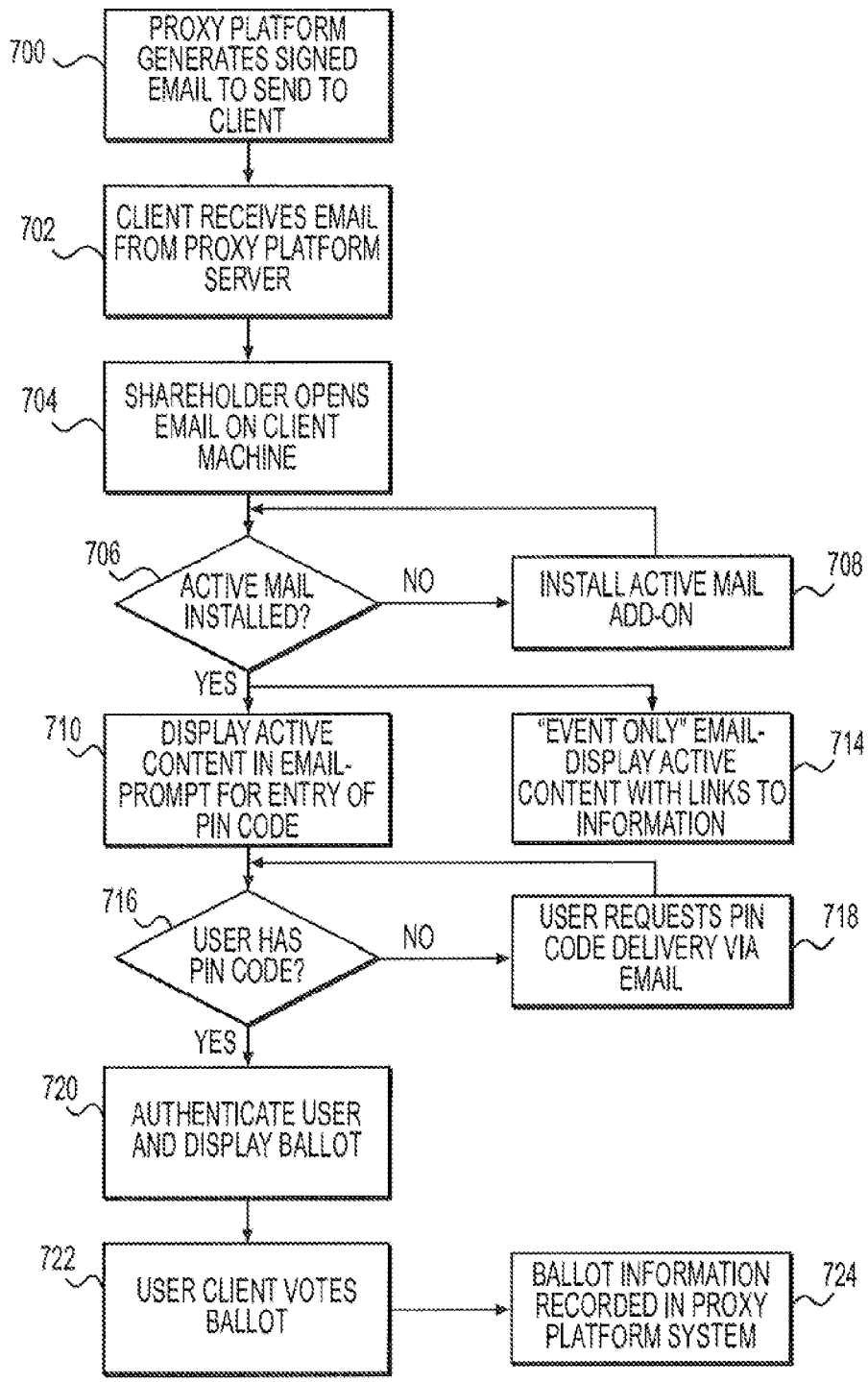
FIG. 7 illustrates processing logic for electronic delivery of regulated shareholder communications to account holder e-mail addresses in an exemplary embodiment.

FIG. 7 illustrates processing logic for electronic delivery of regulated shareholder communications to account holder email addresses in an exemplary embodiment. This figure illustrates the flow of information from the time that an e-mail alert is created to the time when the shareholder's vote gets recorded in the EZ-Proxy service provider's system. It is essentially the same process as described in FIGS. 1-6, but in a schematic format.

Processing begins with the proxy platform service provider generating a signed (i.e., secure) shareholder e-mail to send from the service provider's proxy voting server (i.e., proxy platform) to the shareholder client as indicated in logic block 700. The shareholder client receives the shareholder e-mail communication as indicated in logic block 702. The shareholder then opens the e-mail on the shareholder client's machine as indicated in logic block 704.

In decision block 706, a test is performed to determine if the ActiveMail client add-on is installed on the shareholder client's machine. If the ActiveMail client is not installed, the processing logic will install the add-on before the shareholder can access the active content of the e-mail communication. This step is indicated in logic block 708. The shareholder e-mail then displays active content and prompts the shareholder for entry of a PIN code as indicated in logic block 710. In an "Event Only" e-mail, active content provided by the proxy platform is displayed with links to information as indicated in logic block 714.

In decision block 716, a determination is made as to whether the shareholder user has a PIN code. If he does not have a PIN code, the shareholder user can request one as indicated in logic block 718. Following entry of the PIN code, the shareholder/user is authenticated by the service provider's proxy platform and a ballot is displayed to the user as indicated in logic block 720. The shareholder/user can then review and vote the ballot as indicated in logic block 722. The ballot information is then received, recorded, and aggregated in the service provider's proxy platform as indicated in logic block 724. The shareholder/user can submit additional ballots as long as the shareholder communication e-mail is not deleted from his e-mail client. Each new ballot submission overrides the previous ballot of the shareholder/user.

As will be appreciated by one skilled in the art, the disclosed embodiments may be implemented as a system, method or computer program product. Accordingly, disclosed embodiments may take the form of an entirely software embodiment (including firmware, resident software, micro-code, etc.), or an embodiment combining software and hardware aspects that may all generally be referred to herein as a "circuit," "module" or "system." Furthermore, the disclosed embodiments may take the form of a computer program product embodied in one or more computer readable mediums having computer readable program code embodied thereon.

Any combination of one or more computer readable mediums may be utilized. The computer readable medium may be a computer readable storage medium. A computer readable storage medium may be, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this application, a computer readable storage medium may be any tangible medium that can contain, or store a program for use by, or in connection with, an instruction execution system, apparatus, or device.

Computer program code for carrying out operations for the disclosed embodiments may be written in any combination of one or more programming languages, including an object oriented programming language and conventional procedural programming languages. The program code may execute entirely on the user's computer, partly on the user's computer, as a stand-alone software package, partly on the user's computer and partly on a remote computer, or entirely on the remote computer or a server. In the latter scenario, the remote computer may be connected to the user's computer through any type of network, including a local area network (LAN) or a wide area network (WAN), or the connection may be made to an external computer (for example, through the Internet using an Internet Service Provider). The network connection may be wired or wireless.

The disclosed embodiments have been described with reference to flowchart illustrations and/or block diagrams of methods, systems, and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

The computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means plus function elements in any claims below are intended to include any structure, material, or acts for performing the function in combination with other claim elements as specifically claimed Those skilled in the art will appreciate that many modifications to the exemplary embodiments are possible without departing from the scope of the present invention. In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the invention is defined solely by the appended claims.

What is claimed:

1. A computer-implemented method for electronic delivery of regulated shareholder communications to registered electronic mail client accounts comprising:

generating a signed regulated shareholder communication electronic mail by a proxy platform server computer and transmitting the shareholder communication electronic mail to an electronic mail address inbox of an email client of a client computer;

delivering within the shareholder communication electronic email an active content associated with the shareholder communication electronic email by the proxy platform server computer when the shareholder communication electronic email is opened by a user on the email client on the client computer;

authenticating the user by the proxy platform server computer;

delivering a voting ballot by the proxy platform server computer within the authenticated user's opened shareholder communication electronic email; and recording the ballot votes submitted from the opened shareholder communication electronic email by the user in a proxy platform server computer voting database.

2. The computer-implemented method for electronic delivery of claim 1 further comprising enabling the user to resubmit the voting ballot a plurality of times until a deadline for voting is reached.

3. The computer-implemented method for electronic delivery of claim 2 further comprising recording each new voting ballot submitted by the user and storing the new ballot votes over each preceding ballot vote.

4. The computer-implemented method for electronic delivery of claim 2 further comprising disabling the user's capability to resubmit the voting ballot when the user deletes the shareholder communication electronic mail from the electronic mail client.

5. The computer-implemented method for electronic delivery of claim 1 further comprising providing links to a plurality of shareholder meeting materials within the active content provided by the proxy platform.

6. The computer-implemented method for electronic delivery of claim 1 further comprising providing hyperlinks corresponding to shareholder proposals to related sections of a proxy statement.

7. A system for electronic delivery of regulated shareholder communications to registered electronic mail accounts comprising:
   a proxy platform server computer including:
   a memory for recording and storing a plurality of ballot votes received from a plurality of shareholders in a voting database;
   a processor executing a plurality of modules including:
      a module for generating a signed regulated shareholder communication electronic mail and transmitting the shareholder communication electronic mail to an electronic mail address inbox of an email client of a client computer;
      a module for delivering within the shareholder communication electronic mail an active content associated with the shareholder communication electronic mail when the shareholder communication electronic mail is opened by a user on the email client on the client computer;
      a module for authenticating the user;
      a module for delivering a voting ballot within the authenticated user's opened shareholder communication electronic mail; and
      a module for recording the ballot votes submitted from the opened shareholder communication electronic mail by the user in the voting database.

8. The system for electronic delivery of claim 7 wherein the plurality of modules further includes a module for enabling the user to resubmit the voting ballot a plurality of times until a deadline for voting is reached.

9. The system for electronic delivery of claim 8 wherein the plurality of modules further includes a module for recording each new voting ballot submitted by the user and storing the new ballot votes over each preceding ballot vote.

10. The system for electronic delivery of claim 8 wherein the plurality of modules further includes a module for disabling the user's capability to resubmit the voting ballot when the user deletes the shareholder communication electronic mail.

11. The system for electronic delivery of claim 7 wherein the plurality of modules further includes a module for providing links to a plurality of shareholder meeting materials within the active content.

12. The system for electronic delivery of claim 7 wherein the plurality of modules further includes a module for providing hyperlinks corresponding to shareholder proposals to related sections of a proxy statement.

13. A computer program product for electronic delivery of regulated shareholder communications to registered electronic mail client accounts when executed on a computer processor, the computer program product comprising a tangible computer readable storage medium having encoded thereon:
   program instructions that cause the processor to generate a signed regulated shareholder communication electronic mail and transmit the shareholder communication electronic mail to an electronic mail address inbox of an email client of a client computer;
   program instructions that cause the processor to deliver within the shareholder communication electronic mail an active content associated with the shareholder communication electronic mail when the shareholder communication electronic mail is opened by a user on the email client on the client computer;
   program instructions that cause the processor to authenticate the user;
   program instructions that cause the processor to deliver a voting ballot within the authenticated user's opened shareholder communication electronic mail; and
   program instructions that cause the processor to record the ballot votes submitted from the opened shareholder communication electronic mail by the user in a voting database.

14. The computer program product for electronic delivery of claim 13 wherein the computer readable storage medium has encoded thereon program instructions that cause the processor to enable the user to resubmit the voting ballot a plurality of times until a deadline for voting is reached.

15. The computer program product for electronic delivery of claim 14 wherein the computer readable storage medium has encoded thereon program instructions that cause the processor to record each new voting ballot submitted by the user and store the new ballot votes over each preceding ballot vote.

16. The computer program product for electronic delivery of claim 14 wherein the computer readable storage medium has encoded thereon program instructions that cause the processor to disable the user's capability to resubmit the voting ballot when the user deletes the shareholder communication electronic mail.

17. The computer program product for electronic delivery of claim 13 wherein the computer readable storage medium has encoded thereon program instructions that cause the processor to provide links to a plurality of shareholder meeting materials within the active content.

18. The computer program product for electronic delivery of claim 13 wherein the computer readable storage medium has encoded thereon program instructions that cause the processor to provide hyperlinks corresponding to shareholder proposals to related sections of a proxy statement.

* * * * *